US012742352B2

(12) United States Patent
Smothers et al.

(10) Patent No.: US 12,742,352 B2
(45) Date of Patent: Sep. 22, 2026

(54) END CAP AND CORNER BLOCK FOR FENESTRATION UNIT

(71) Applicant: Pella Corporation, Pella, IA (US)

(72) Inventors: Shawn Smothers, Pella, IA (US); Andrew Morse, Pella, IA (US); Mohammad Abdelrahim, Pella, IA (US); Joshua Zehner, Pella, IA (US)

(73) Assignee: Pella Corporation, Pella, IA (US)

( * ) Notice: Subject to any disclaimer, the term of this patent is extended or adjusted under 35 U.S.C. 154(b) by 248 days.

(21) Appl. No.: 18/637,535

(22) Filed: Apr. 17, 2024

(65) Prior Publication Data

US 2024/0344383 A1 Oct. 17, 2024

Related U.S. Application Data

(60) Provisional application No. 63/459,790, filed on Apr. 17, 2023.

(51) Int. Cl.

| | |
|---|---|
| ***E06B 3/96*** | (2006.01) |
| ***E06B 1/64*** | (2006.01) |
| ***E06B 3/964*** | (2006.01) |
| ***E06B 3/968*** | (2006.01) |

(52) U.S. Cl.
CPC .............. *E06B 1/64* (2013.01); *E06B 3/9636* (2013.01); *E06B 3/9642* (2013.01); *E06B 3/9687* (2013.01)

(58) Field of Classification Search
CPC ........ E06B 1/64; E06B 3/9642; E06B 3/9687; E06B 3/9636
USPC ........................................... 52/204.52, 656.9
See application file for complete search history.

(56) References Cited

U.S. PATENT DOCUMENTS 2,611,633 A * 9/1952 Webster .................. E06B 3/726 403/231
2,736,403 A * 2/1956 Gwynne ............... E06B 3/9636 52/645
3,270,477 A * 9/1966 Johnston ............... E06B 3/9636 52/656.4
3,357,149 A * 12/1967 Johnston ............... E06B 3/9636 52/204.597
3,375,030 A * 3/1968 Thompson ........... B62D 33/044 403/231

(Continued)

FOREIGN PATENT DOCUMENTS

BE 1029045 A1 8/2022
CA 2138579 A1 6/1995
CA 2665981 C 11/2009

*Primary Examiner* — Brent W Herring

(57) ABSTRACT

Devices, systems, and methods related to a fenestration unit are described herein. The fenestration unit may include a horizontal member and a vertical member that intersect at a corner. The fenestration unit may include an end cap coupled within an access opening including a housing including a horizontal housing portion and vertical housing portion, the horizontal housing portion coupled to a seal and the vertical housing portion defining a cover operable to cover the access opening. The fenestration unit may include a corner block operable to couple the horizontal member and the vertical member including a body including a top portion, a first side portion, a second side portion, and a bottom portion, the body defining a plurality of cavities, the plurality of cavities each operable to receive a fastener therethrough.

20 Claims, 16 Drawing Sheets

(56) References Cited

U.S. PATENT DOCUMENTS

| | | | | |
|---|---|---|---|---|
| 3,772,837 | A * | 11/1973 | Hunt | E06B 3/9642 49/504 |
| 3,798,863 | A * | 3/1974 | Latson | E06B 3/9636 52/204.597 |
| 3,816,011 | A * | 6/1974 | Biebuyck | E06B 3/9636 403/187 |
| 3,844,084 | A * | 10/1974 | Hubbard | B62D 33/044 52/843 |
| 3,864,051 | A * | 2/1975 | Reid | F16B 7/0446 411/180 |
| 4,558,548 | A | 12/1985 | Hieger | |
| 4,884,376 | A * | 12/1989 | DeBlock | E06B 1/363 D25/1 |
| 5,136,814 | A | 8/1992 | Headrick | |
| 5,655,342 | A | 8/1997 | Guillemet et al. | |
| 5,655,343 | A | 8/1997 | Seals | |
| 5,673,516 | A | 10/1997 | Hughes et al. | |
| 6,006,817 | A | 12/1999 | Stone et al. | |
| 6,018,976 | A | 2/2000 | Wolf | |
| 6,216,402 | B1 | 4/2001 | Van De Laar | |
| 6,449,906 | B1 | 9/2002 | Jacobs | |
| 6,928,696 | B2 | 8/2005 | Wartman | |
| 7,162,841 | B2 | 1/2007 | Kownacki | |
| 7,841,138 | B1 * | 11/2010 | Frey | E06B 3/9687 52/800.1 |
| 7,886,501 | B2 | 2/2011 | Bartlett et al. | |
| 8,490,332 | B2 | 7/2013 | Van Camp et al. | |
| 8,490,347 | B2 | 7/2013 | Valler et al. | |
| 8,567,128 | B2 | 10/2013 | Van Camp et al. | |
| 8,813,437 | B1 | 8/2014 | Spofford | |
| 8,955,195 | B2 | 2/2015 | Chang et al. | |
| 8,997,412 | B1 * | 4/2015 | Header | E06B 1/18 52/204.71 |
| 9,127,504 | B2 * | 9/2015 | Sprague | E06B 3/70 |
| 9,359,806 | B2 * | 6/2016 | Header | E06B 1/524 |
| 10,202,797 | B1 * | 2/2019 | Header | E06B 3/26303 |
| 10,246,886 | B2 | 4/2019 | Mitchell | |
| 10,415,299 | B2 | 9/2019 | Mitchell | |
| 11,060,344 | B2 | 7/2021 | Kling | |
| 11,131,139 | B2 | 9/2021 | Cazarez et al. | |
| 11,585,122 | B2 * | 2/2023 | Meyer | E05C 7/045 |
| 12,270,236 | B2 | 4/2025 | Procton et al. | |
| 2010/0071303 | A1 * | 3/2010 | Mansueto | E06B 3/9681 52/745.15 |
| 2014/0311035 | A1 | 10/2014 | Gilliam | |
| 2016/0362922 | A1 * | 12/2016 | Wei | A47K 3/34 |
| 2021/0131171 | A1 * | 5/2021 | Choi | E06B 3/9641 |
| 2023/0220724 | A1 * | 7/2023 | Larkin | E06B 3/726 52/458 |
| 2024/0151096 | A1 | 5/2024 | Sahin | |
| 2024/0200392 | A1 | 6/2024 | Hansen et al. | |

* cited by examiner

END CAP AND CORNER BLOCK FOR FENESTRATION UNIT

CROSS-REFERENCE TO RELATED APPLICATIONS

This application claims priority to U.S. Provisional Patent Application No. 63/459,790, filed Apr. 17, 2023, the disclosure of which is hereby incorporated by reference in its entirety.

BACKGROUND

Homeowners may install fenestration units into their homes for a variety of reasons including for ventilation or for ingress and egress. Fenestration units, such as sliding doors and windows, may include interior adjustment features, such as roller or wheel height. However, access to an interior of a fenestration unit panel or fenestration unit frame to perform maintenance, repairs, and adjustments may be difficult or require the fenestration unit to be uninstalled for maintenance. Additionally, assembly of various components, and particularly the profiles of a fenestration unit may be time consuming or otherwise complicated.

SUMMARY

Various aspects of this specification describe to a fenestration unit that includes a panel having a horizontal member (e.g., a rail) and a vertical member (e.g., a stile) that intersect at a corner and define an access opening and an end cap coupled within the access opening and/or a corner block located at the intersection of the horizontal and vertical members is disclosed within. In some embodiments, the access opening is defined by a frame of the fenestration unit. In some embodiments, the fenestration unit includes a seal coupled to the horizontal member and extending lengthwise along the horizontal member and the end cap may be coupled to the seal to form a continuous seal along the horizontal member and at the corner. Various aspects of this patent specification relate to a fenestration unit that allows for access to an interior of a fenestration unit without de-installation or removal from the fenestration unit from a building structure. In some embodiments, the end cap includes a plug removably coupled to the end cap that provides access to an interior of the fenestration unit (e.g., access to a roller mount) without removing other components of the fenestration unit. In some embodiments, the end cap is removably coupled to the panel such that access to an interior of the fenestration unit is achievable without removing other components. In some embodiments, security is enhanced, and time and cost savings are realized by the ability to access an interior of the fenestration unit without removal of the fenestration unit itself, or removal of components of the fenestration unit from the building structure.

According to one example ("Example 1"), a fenestration unit comprises a panel including a horizontal member and a vertical member, the horizontal member and the vertical member intersecting at a corner, the corner including an access opening, a seal coupled to the horizontal member and extending lengthwise along the horizontal member, and an end cap coupled within the access opening, the end cap including, a housing including a horizontal housing portion and vertical housing portion, the horizontal housing portion coupled to the seal and the vertical housing portion defining a cover operable to cover the access opening.

According to another example ("Example 2"), further to Example 1, the housing includes plastic.

According to another example ("Example 3"), further to Example 1, the housing includes rubber.

According to another example ("Example 4"), further to Example 1, the housing includes metal.

According to another example ("Example 5"), further to Example 1, the housing includes an angled wall connecting the vertical housing portion and the horizontal housing portion.

According to another example ("Example 6"), further to Example 1, the horizontal housing portion has a bottom opening operable to receive a fastener to couple the end cap to the seal.

According to another example ("Example 7"), further to Example 1, the cover has a side opening.

According to another example ("Example 8"), further to Example 7, the side opening is circular.

According to another example ("Example 9"), further to Example 7, the fenestration unit further includes a plug removably coupled within the side opening.

According to another example ("Example 10"), further to Example 1, the vertical housing portion defines a cover flange configured to abut against the first side of the panel.

According to one example ("Example 11"), a fenestration unit comprises a panel having a top, a bottom, a first side and a second side, the panel including a rail and a stile, the rail and the stile intersecting at a corner defined at the bottom and the first side of the panel, the panel defining an access opening proximate the corner and an end cap coupled to at least one of the stile and the rail proximate to the corner, the end cap including a housing including a horizontal housing portion and a vertical housing portion, the vertical housing portion defining a cover positioned within the access opening, the cover being operable to be rotated into position within the access opening by fully inserting the horizontal housing portion into the access opening and then rotating the vertical housing portion into engagement with the panel.

According to another example ("Example 12"), further to Example 11, the housing includes an angled wall connecting the vertical housing portion and the horizontal housing portion.

According to another example ("Example 13"), further to Example 11, the vertical housing portion defines a cover flange configured to abut against the first side of the panel.

According to another example ("Example 14"), further to Example 13, the cover flange creates a seal between the end cap and the panel.

According to another example ("Example 15"), further to Example 11, the cover includes a curved upper engagement edge operable to engage with an edge of the access opening.

According to another example ("Example 16"), further to Example 11, the fenestration unit further comprises a horizontal seal extending lengthwise along the rail.

According to another example ("Example 17"), further to Example 16, the end cap is coupled to the horizontal seal via a fastener.

According to another example ("Example 18"), further to Example 11, a lower edge of the end cap is rotatably positioned within a lower edge of the access opening to form a hinge.

According to one example ("Example 19"), a fenestration unit comprises a frame including a plurality of frame members, wherein the frame has a top, a bottom, a first side, a second side and defining a corner at the intersection of the first side and the bottom, the plurality of frame members including a stile at the first side and a rail at the bottom, the at least one rail and the at least one stile coupled together proximate the corner, the stile having an access opening proximate the corner and an end cap removably coupled to the stile in the access opening proximate the corner, the end cap including a housing having a vertical portion extending along the first side of the frame and a horizontal portion extending along the bottom of the frame, the housing including an angled wall connecting the vertical portion and the horizontal portion, the horizontal portion including a seal support configured to support a bottom seal of the frame and the vertical portion having a cover flange engaging the frame at the first side, the cover including a curved upper engagement edge operable to engage with an edge of the access opening.

According to another example ("Example 20"), further to Example 19, the seal support includes a bottom opening defined the horizontal portion, the bottom opening operable to receive a fastener to couple the end cap to a seal of the rail.

According to one example ("Example 21"), a fenestration unit comprises a panel including a horizontal member and a vertical member, the horizontal member and the vertical member intersecting at a corner, a roller mount coupled to the horizontal member, the roller mount including a set of rollers, a corner block operable to couple the horizontal member and the vertical member, the corner block removably coupled to the roller mount, the corner block including a body including a top portion, a first side portion, a second side portion, and a bottom portion, the body defining a plurality of cavities, the plurality of cavities each operable to receive a fastener therethrough.

According to another example ("Example 22"), further to Example 21, the body includes aluminum.

According to another example ("Example 23"), further to Example 21, the plurality of cavities includes a first cavity on the first side portion of the body and a second cavity on the second side portion of the body, wherein the first cavity and the second cavity are across from each other.

According to another example ("Example 24"), further to Example 23, the first cavity and the second cavity are substantially the same size.

According to another example ("Example 25"), further to Example 24, the first cavity receives a first fastener therethrough and the second cavity receives a second fastener therethrough, the first fastener and the second fastener operable to removably couple to the horizontal member.

According to another example ("Example 26"), further to Example 23, the plurality of cavities further includes a third cavity located on a top portion of the body, the third cavity located substantially between the first cavity and the second cavity.

According to another example ("Example 27"), further to Example 26, the third cavity is smaller than both the first cavity and the second cavity.

According to another example ("Example 28"), further to Example 27, the third cavity is operable to receive a third fastener, the third fastener operable to removably couple to the vertical member.

According to another example ("Example 29"), further to Example 28, the vertical member includes a vertical mount, and the third fastener is removably coupled to the vertical mount.

According to another example ("Example 30"), further to Example 26, the first cavity, the second cavity, and the third cavity are rounded.

According to another example ("Example 31"), further to Example 26, the plurality of cavities further includes a fourth cavity, the fourth cavity located on a bottom portion of the body.

According to another example ("Example 32"), further to Example 31, the fourth cavity is rounded.

According to another example ("Example 33"), further to Example 31, the fourth cavity is larger than each of the first cavity, the second cavity, and the third cavity.

According to another example ("Example 34"), further to Example 31, the fourth cavity is directly below the third cavity.

According to another example ("Example 35"), further to Example 31, the fourth cavity is configured to receive a fourth fastener to removably couple to the roller mount.

According to one example ("Example 36"), a method of assembling a fenestration unit comprising a panel, the panel including a horizontal member and a vertical member, the horizontal member and the vertical member intersecting at a corner comprises coupling the horizontal member of the panel to a corner block, the corner block including a body including a top portion, a first side portion, a second side portion, and a bottom portion, the body defining a first cavity at the first side portion and a second cavity at the second side position and the horizontal member being coupled to the corner block at both the first cavity and the second cavity and coupling the vertical member of the panel to the corner block, the body defining a third cavity at the top portion and the vertical member being coupled to the corner block at the third cavity.

According to another example ("Example 37"), further to Example 36, the method further includes the step of coupling the corner block to a roller mount coupled to the horizontal member, wherein the body of the corner block defines the fourth cavity at the bottom portion and the roller mount is coupled at the fourth cavity.

According to another example ("Example 38"), further to Example 36, the step of coupling the horizontal member of the panel to the corner block is performed prior the step of coupling the vertical member to the corner block.

According to one example ("Example 39"), a method of adjusting a height of a fenestration unit comprising a panel, the panel including a horizontal member, a vertical member, and a roller mount coupled to the horizontal member, the horizontal member and the vertical member intersecting at a corner, the corner including an access opening comprises accessing an end cap coupled within the access opening of the panel, the end cap including a housing defining a cover operable to cover the access opening, where the cover defines a side opening and the side opening is covered by a plug removably coupled to the end cap, removing the plug of the end cap to uncover the side opening, and adjusting a height of the roller mount by rotating a threaded fastener of the roller mount, wherein the threaded fastener of the roller mount is accessible through the side opening of the end cap.

According to another example ("Example 40"), further to Example 39, adjusting a height of the roller mount by rotating the threaded fastener further includes inserting a screwdriver into the opening.

The foregoing Examples are just that and should not be read to limit or otherwise narrow the scope of any of the inventive concepts otherwise provided by the instant disclosure. While multiple examples are disclosed, still other embodiments will become apparent to those skilled in the art from the following detailed description, which shows and describes illustrative examples. Accordingly, the drawings and detailed description are to be regarded as illustrative in nature rather than restrictive in nature.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

DETAILED DESCRIPTION

Definitions and Terminology

Figure 1:
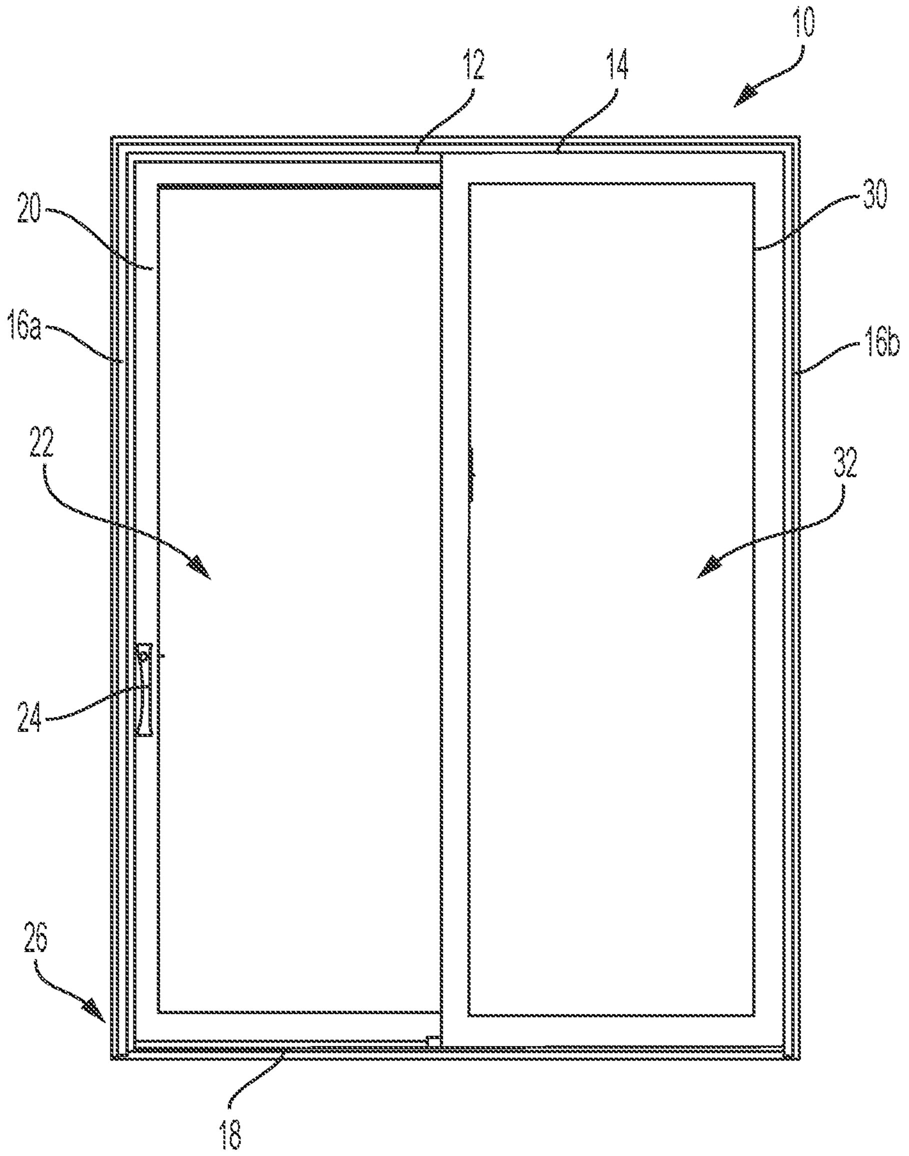
FIG. 1 is a front view of a fenestration unit for installation in a building structure, in accordance with some embodiments.

This disclosure is not meant to be read in a restrictive manner. For example, the terminology used in the application should be read broadly in the context of the meaning those in the field would attribute such terminology.

With respect to terminology of inexactitude, the terms "about" and "approximately" may be used, interchangeably, to refer to a measurement that includes the stated measurement and that also includes any measurements that are reasonably close to the stated measurement. Measurements that are reasonably close to the stated measurement deviate from the stated measurement by a reasonably small amount as understood and readily ascertained by individuals having ordinary skill in the relevant arts. Such deviations may be attributable to measurement error, differences in measurement and/or manufacturing equipment calibration, human error in reading and/or setting measurements, minor adjustments made to optimize performance and/or structural parameters in view of differences in measurements associated with other components, particular implementation scenarios, imprecise adjustment and/or manipulation of objects by a person or machine, and/or the like, for example. In the event it is determined that individuals having ordinary skill in the relevant arts would not readily ascertain values for such reasonably small differences, the terms "about" and "approximately" can be understood to mean plus or minus 10% of the stated value.

The terms "interior" and "exterior" are generally meant to reference opposite sides of a fenestration unit unless directly specified that "exterior" means exposed to the elements. For example, a fenestration unit installed within an interior of a building structure (e.g., a bedroom door) still has opposing "interior" and "exterior" sides as those terms are used in this patent specification, though the "exterior" is still disposed within the building structure itself.

The term "fenestration unit" is meant to cover any of a variety of products for providing venting, viewing, ingress, or egress from a building structure into which the fenestration unit is installed. Examples include doors, windows, and the like.

The terms "building" or "structure" is meant to cover any of a variety of structures. Examples include single- or multi-family homes, residential buildings, commercial buildings, and others.

The term "opening" as used in the context of a "building" or "structure" may include rough openings in the building, including rough openings in an exterior wall or boundary of the structure or internal wall or boundary of the structure.

Relative terms such as "upper", "lower", "top", "bottom", "horizontal," "vertical", "left", "right" and the like are construed broadly and are used to describe the orientation of components relative to one another, rather than in an absolute sense, unless otherwise indicated.

Description of Various Embodiments

Persons skilled in the art will readily appreciate that various aspects of the present disclosure can be realized by any number of methods and apparatuses configured to perform the intended functions. It should also be noted that the accompanying drawing figures referred to herein are not necessarily drawn to scale but may be exaggerated to illustrate various aspects of the present disclosure, and in that regard, the drawing figures should not be construed as limiting.

FIG. 1 is a front view of a fenestration unit 10 for installation in a building structure (not shown), in accordance with an embodiment. FIG. 1 depicts the fenestration unit 10 as would be viewed an interior side of the building structure. As shown, the fenestration unit 10 includes a frame 12. The frame 12 may include a plurality of frame members including a top frame member 14, a first side frame member 16*a*, a second side frame member 16*b*, and a bottom frame member 18. The first side frame member 16*a* and the bottom frame member 18 may define a corner 26 at the intersection of the first side frame member 16*a* and the bottom frame member 18. In some embodiments, the first side frame member 16*a* may be a stile and the bottom frame member 18 may be a rail where the stile and the rail are coupled together proximate to the corner 26. However, the corner 26 may be formed and defined at any of the intersections between the top frame member 14, the first side frame member 16*a*, the second side frame member 16*b*, and the bottom frame member 18. Similarly, any of the top frame member 14 and bottom frame member 18 may include a rail and any of the first and second side frame members may include a stile.

The frame 12 and its components may be installed in the opening of the building structure and support a set of panels 20, 30 of the fenestration unit 10. In some embodiments, the panel 20 is a sliding panel 20 and panel 30 is a fixed panel 30. In other embodiments, the reverse configuration is contemplated. In still further embodiments, the set of panels 20, 30 of the fenestration unit 10 are sliding panels 20, 30. The panel 20 may support a glazing unit 22 and the panel 30 may support a glazing unit 32. As alternatives to glazing units, the panels 20, 30 may support any of a variety of inserts, including inserts made of wood, metal, glass or other transparent or non-transparent materials as desired. The fenestration unit may further include a handle 34. Although the fenestration unit 10 depicted is a sliding door, it is understood that the fenestration unit 10 described herein may also be implemented with respect to sliding windows.

Figure 2:
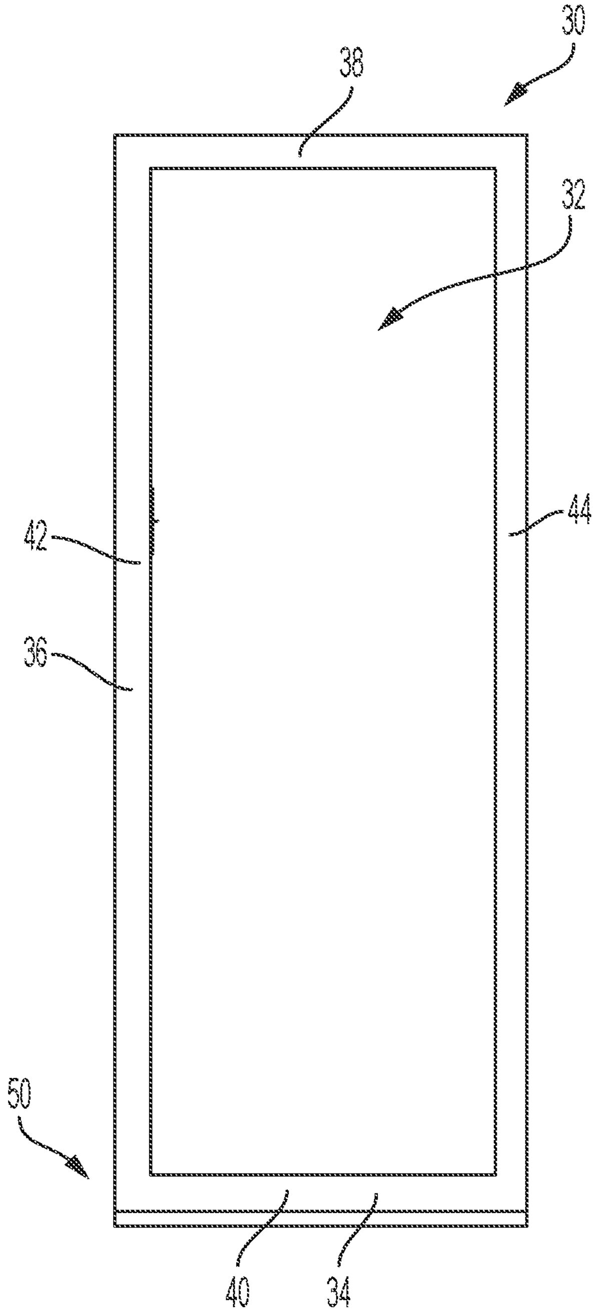
FIG. 2 is a front view of a panel of the fenestration unit of FIG. 1, in accordance with some embodiments.

FIG. 2 is a front view of the panel 30 of the fenestration unit 10 of FIG. 1, in accordance with an embodiment. In some embodiments, the panel 30 is the sliding panel 30. In other embodiments the panel 30 is the fixed panel 30. The panel 30 may include a top 38, a bottom 40, a first side 42, and a second side 44. The panel 30 may include a horizontal member 34 (e.g., a rail) and a vertical member 36 (e.g., a stile). The vertical member 36 may include any of a vent stile, a fixed stile, a bi-part stile, and/or an interlock. In some embodiments, the horizontal member 34 is the bottom 40 and the vertical member 36 is the first side 42. However, it is understood that the horizontal member 34 may be the top 38 and the vertical member 36 may be the second side 44, or any combination thereof. The horizontal member 34 and the vertical member 36 may intersect at a corner 50. The corner 50 may be a coupling between the vertical member 36 and the horizontal member 34. The corner 50 may be defined at the bottom 40 and first side 42 of the panel 30. However, it is understood that the corner 50 may be formed at the intersection of any combination of the top 38, the bottom 40, the first side 42, and the second side 44. A corner block 100 may be used to couple the horizontal member 34 and the vertical member 36 at the corner 50. The corner block 100 will be subsequently described.

Figure 3:
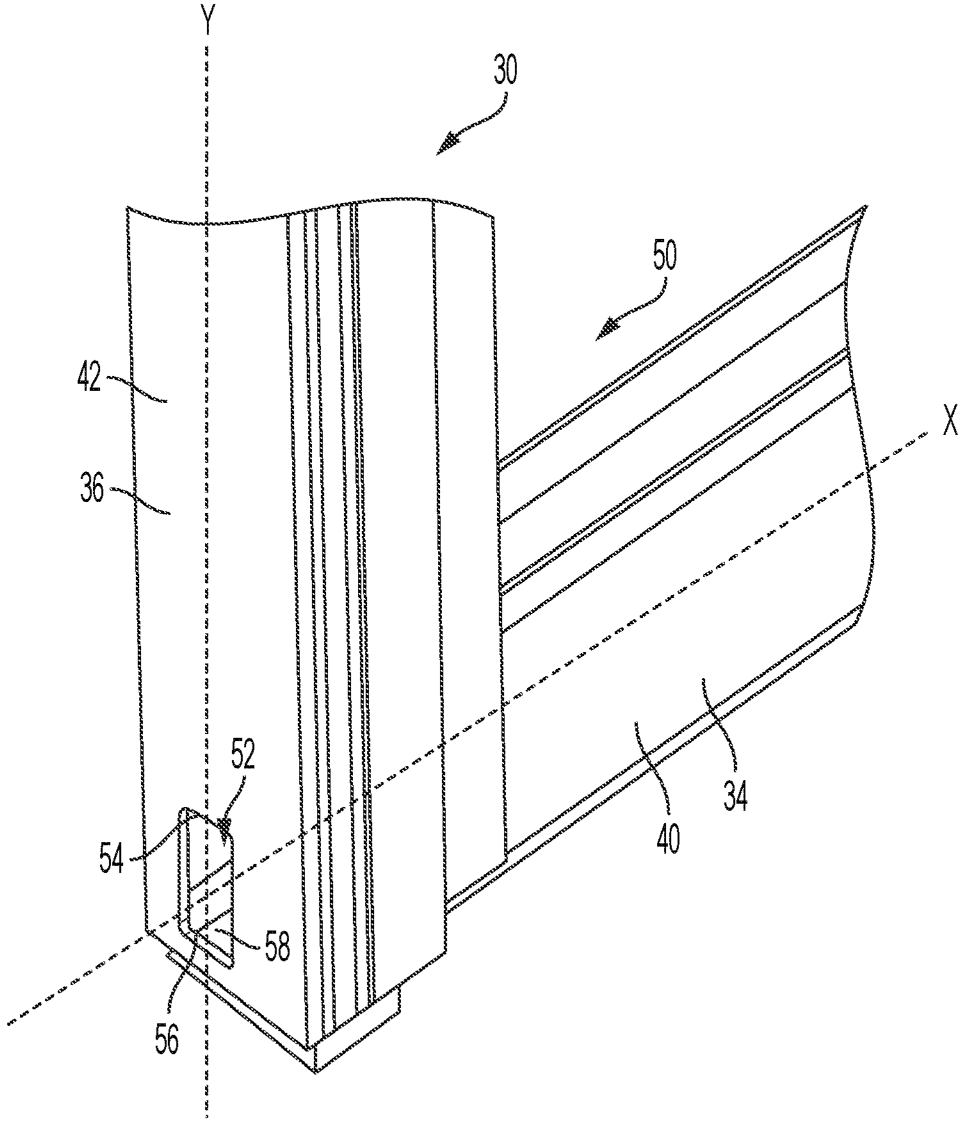
FIG. 3 is an isometric view of a corner defined by the panel, in accordance with some embodiments.

FIG. 3 is an isometric view of the corner 50 defined by the panel 30, in accordance with an embodiment. The corner 50 may include an access opening 52. The access opening 52 may be defined along the vertical member 36 (e.g., the first side 44) of the panel 30 and may be located proximate to the corner 50. The access opening 52 may be positioned such that access to an interior of the horizontal member 34 (e.g., the bottom 40) is allowed. As shown, the access opening 52 includes an upper edge 54 and a lower edge 56. In some embodiments, the upper edge 54 is curved and the lower edge 56 is flat. In some embodiments, the access opening 52 may be located centrally along an intersection of a vertical axis Y of the vertical member 36 and a horizontal axis X of the horizontal member. In other embodiments the access opening 52 may be located offset along the intersection of the vertical axis Y of the vertical member 36 and the horizontal axis X of the horizontal member 34. In some embodiments, the access opening 52 may instead or additionally be defined within the first frame member 16*a* and the proximate to the corner 26 (e.g., as shown in FIG. 1).

Further to FIG. 3, in some embodiments, a seal 58 is coupled to the horizontal member 34 (e.g., a rail) and extends lengthwise along the horizontal member 34. The seal 58 may be coupled at the interior of the horizontal member 34. In some embodiments, the access opening 52 is proximate to the seal 58. In some embodiments, the bottom 40 is a rail and the access opening 52 allows for access to a set of rollers 48 of a roller mount 46 (e.g., as shown in FIG. 4A) along the rail.

Figure 4A:
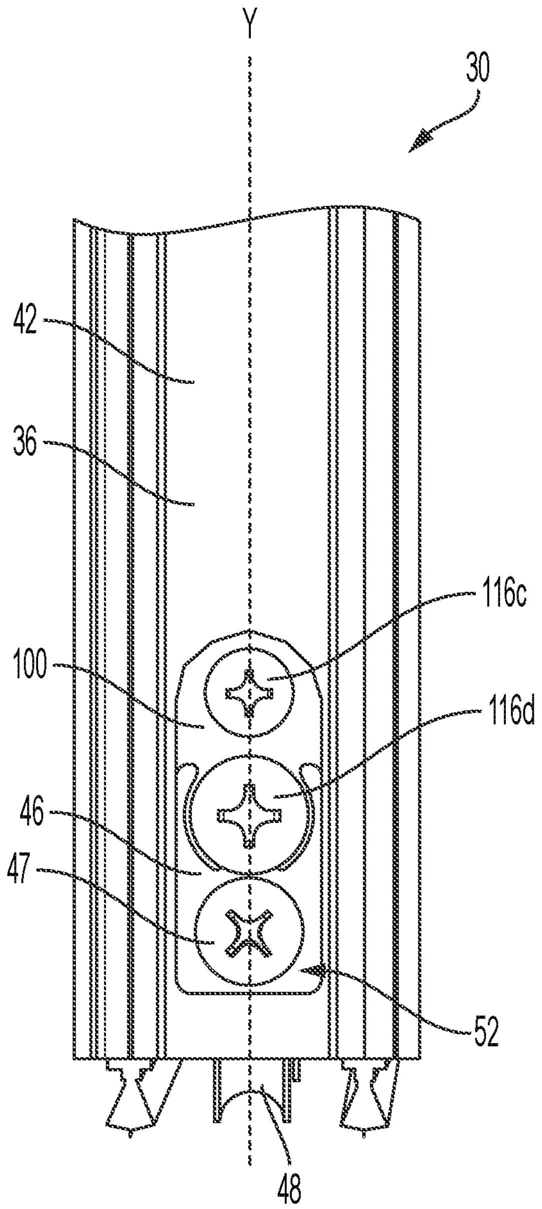
FIG. 4A is a front view of an access opening of the corner, in accordance with some embodiments.
Figure 4B:
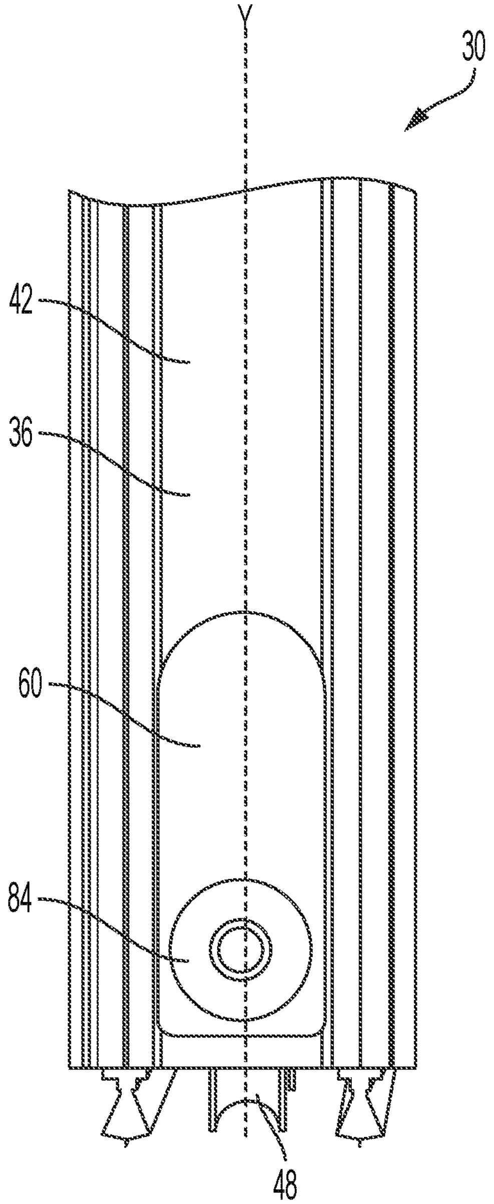
FIG. 4B is a front view of an end cap coupled to the panel, in accordance with some embodiments.
Figure 4C:
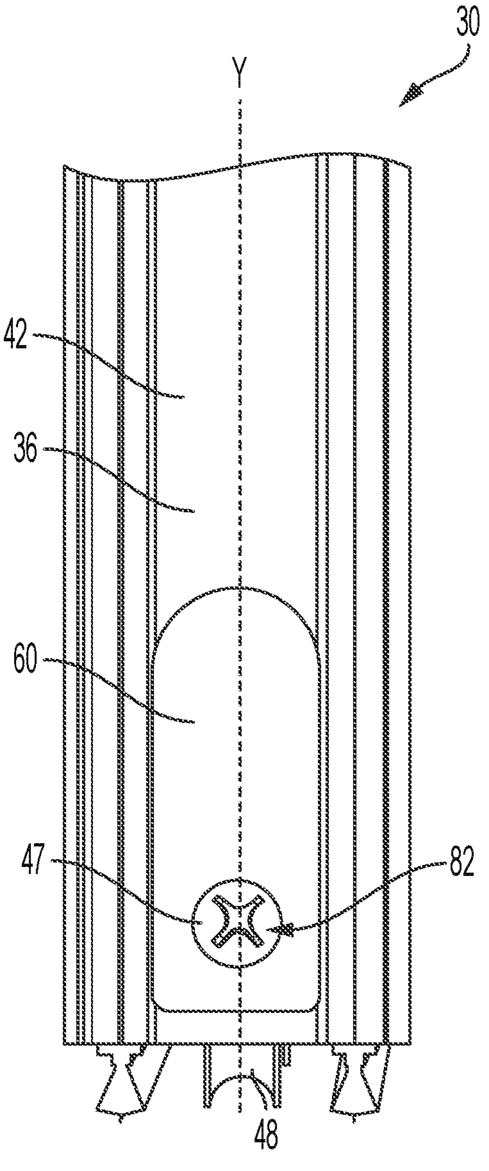
FIG. 4C is a front view of the end cap coupled to the panel with a plug removed, in accordance with some embodiments.

FIG. 4A is a front view of the access opening 52 in accordance with some embodiments. When uncovered, the access opening 52 may expose internal components of the panel 30 including the roller mount 46 and the corner block 100, which will be described subsequently. FIG. 4B is a front view of an end cap 60 coupled to the panel 30 within the access opening 52, in accordance with some embodiments. As shown, the end cap may be removably coupled to the panel 30 within the access opening 52 of the vertical member 36 and may cover internal components of the panel 30. The end cap 60 may be located centrally along the vertical axis Y of the vertical member 36. FIG. 4C is a front view of the end cap 60 coupled to the panel 30 within the access opening 52 with a plug 84 removed, in accordance with some embodiments. Removing the plug 84 may expose a threaded fastener 47 (e.g., a screw) of the roller mount 46. The threaded fastener 47 may be aligned with the opening formed in the end cap 60 when the plug 84 is removed. When the plug 84 is removed, the threaded fastener 47 may be accessed by a tool (e.g., a screwdriver) and rotated to adjust a height of both the roller mount 46 relative to the frame 12. After the height of the roller mount 46 is adjusted, the plug 84 may be re-coupled to the end cap 60 to cover and conceal the threaded fastener 47.

In some embodiments, the end cap 60 is removably coupled to the frame 12 at one of the first frame member 16*a* and the bottom frame member 18 and the proximate to the corner 26 (e.g., as shown in FIG. 1). The end cap 60 may be substantially similar whether removably coupled to the frame 12 or the panel 30.

Figure 5A:
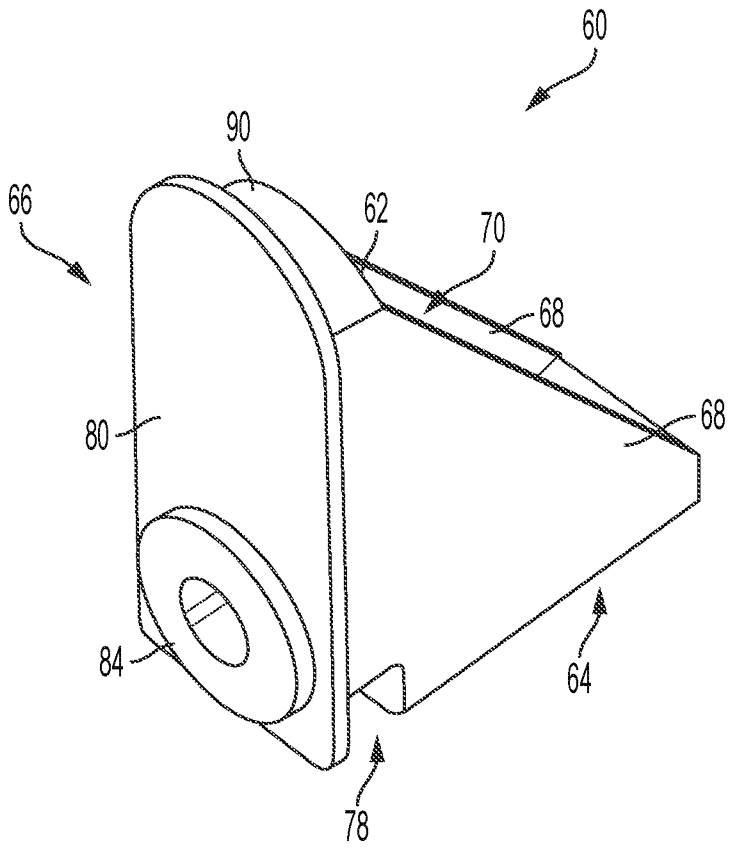
FIGS. 5A-5C is an isometric view, front view, and rear view, respectively of the end cap of FIG. 4B, in accordance with some embodiments.
Figure 5B:
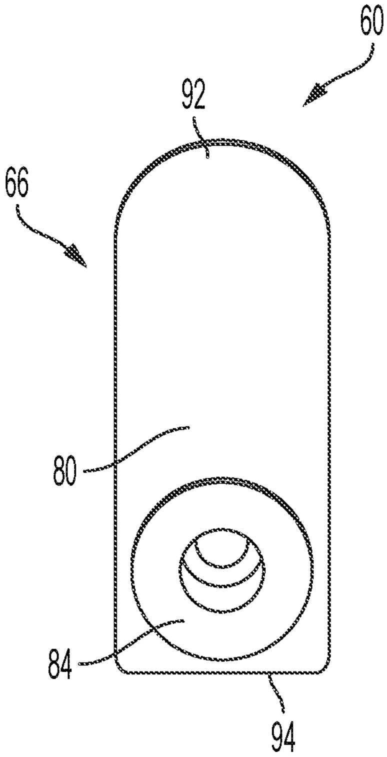
Figure 5C:
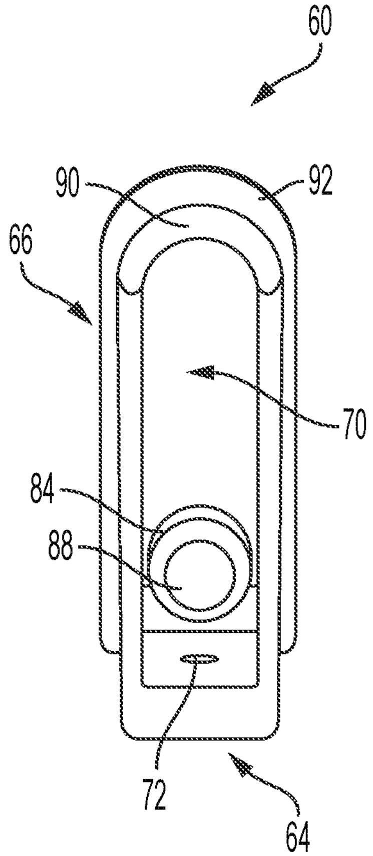

FIGS. 5A-5C is an isometric view, front view, and rear view, respectively of the end cap 60 of FIG. 4B, in accordance with some embodiments.

As shown, the end cap 60 includes a housing 62 which optionally includes or is otherwise formed of plastic or polymeric material. In some embodiments, the housing 62 includes a rubber, or elastomeric material. In still other embodiments, the housing 62 includes, or is otherwise formed of a metallic or metal material. The end cap 60 may optionally include UV resistant materials. As shown, the housing 62 includes a horizontal housing portion 64 and a vertical housing portion 66. In some embodiments, the housing 62 further includes an angled wall 68 connecting the vertical housing portion 66 and the horizontal housing portion 64. In some embodiments, the angled wall 68 may include two angled walls 68 located on opposite sides of the housing 62. The two angled walls 68 may define an inner channel 70 therebetween (e.g., as shown in FIG. 5C).

In some embodiments, the horizontal housing portion 64 may extend lengthwise along the horizontal member 34 (e.g., as shown in FIGS. 7A-8B). In some embodiments, the horizontal housing portion 64 may be coupled to the seal 58 of the horizontal member 34 (e.g., as shown in FIGS. 7A-8A). The seal 58 may be a weather seal. The horizontal housing portion 64 may include a bottom opening 72 (e.g., as shown in FIG. 5C). The bottom opening 72 may be operable to receive a fastener 74 to couple the end cap 60 to the seal 58 (e.g., as shown in FIGS. 7B and 8A). The seal 58 may be operable to receive the fastener 74 therethrough at a complementary opening to secure and couple the seal 58 and the end cap 60 together. The seal 58 and the end cap 60 may then remain coupled when the panel 30 is translated longitudinally (e.g., slid) within the frame 12. The bottom opening 72 and fastener 74 may form a seal support 76 when coupled to the seal 58. The seal support 76 may be operable to extend the seal 58 such that continuous sealing is achieved along the horizontal member 34. The continuous sealing may extend to the corner 50. In some embodiments, the horizontal member 34 includes a second end cap 60 (e.g., the second end cap may be located at the intersection of the horizontal member 34 and second side 44 of the panel 30) such that continuous sealing is achieved across the entirety of the horizontal member 34.

Figure 6A:
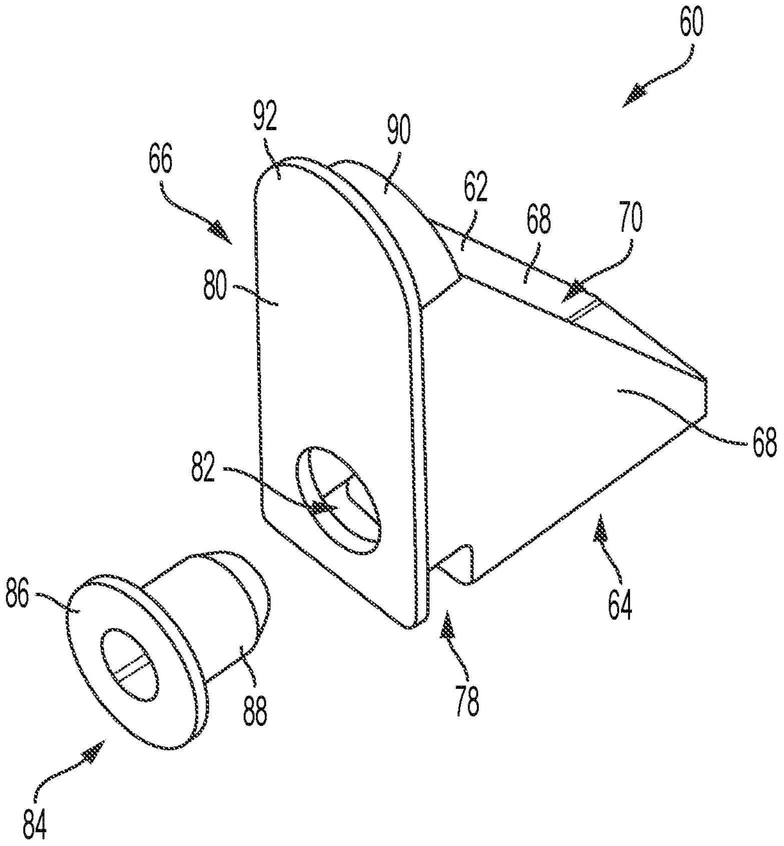
FIGS. 6A-6C are an isometric view, front view, and rear view, respectively of the end cap of FIGS. 5A-5C with a plug removed, in accordance with some embodiments.
Figure 6B:
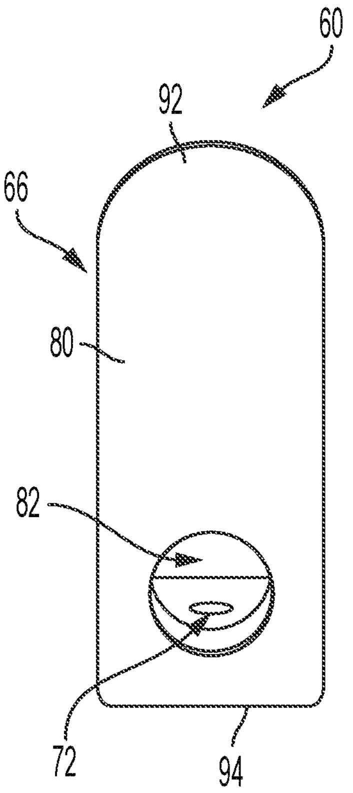
Figure 6C:
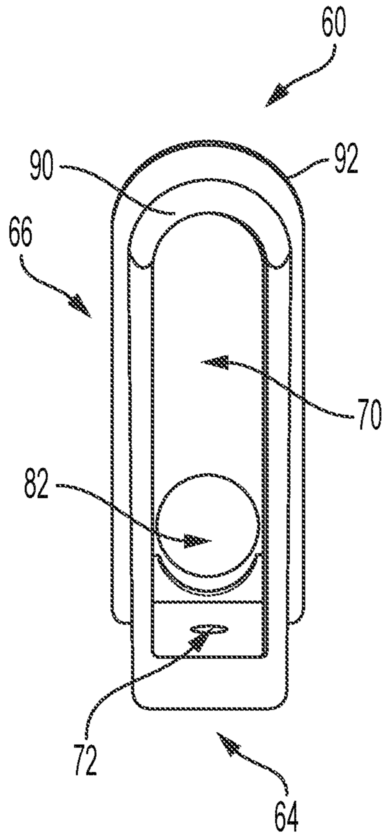

In some embodiments, the vertical housing portion 66 may extend lengthwise along the vertical member 36 (e.g., as shown in FIG. 4). The vertical housing portion 66 may define a cover 80 operable to cover the access opening 52. In some embodiments, a shape of the access opening 52 is complementary to a shape of the cover 80. The cover 80 may include an upper engagement edge 92 and a lower edge 94 (e.g., as shown in FIG. 5B). In some embodiments, the upper engagement edge 92 may be curved. In some embodiments, the upper engagement edge 92 is the same shape as, or is complementary in shape to, the upper edge 54 of the access opening 52 (e.g., as shown in FIGS. 3-4A). In some embodiments, the lower edge 94 of the cover 80 may be flat. In some embodiments, the lower edge 94 of the cover 80 is the same shape as the lower edge 56 of the access opening 52 (e.g., as shown in FIGS. 3-4A). The cover 80 may further define a side opening 82 (e.g., as shown in FIGS. 6A-6C). In some embodiments, the side opening 82 may be circular. The side opening 82 may be covered by a plug 84 that is removably secured within the side opening 82. For example, the plug 84 may include a plug projection 88 that extends within the inner channel 70 defined by the angled walls 68. In some embodiments, the side opening 82 is aligned with the roller mount 46 such that the threaded fastener 47 of the roller mount 46 can be accessed through the side opening 82 (e.g., as shown in FIG. 4C). When the side opening 82 is uncovered by the plug 84, a user can adjust the height of the roller mount 46 by rotating the threaded fastener 47 with a tool (e.g., a screwdriver).

Figure 7A:
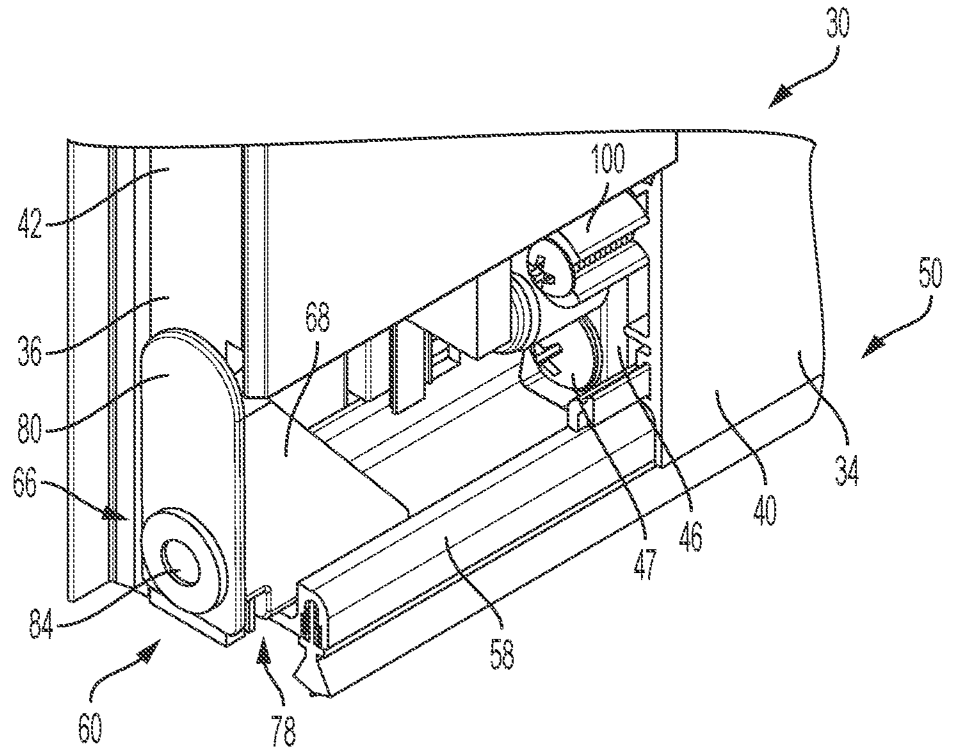
FIG. 7A is an isometric view of the end cap coupled to the panel 30, in accordance with some embodiments.
Figure 7B:
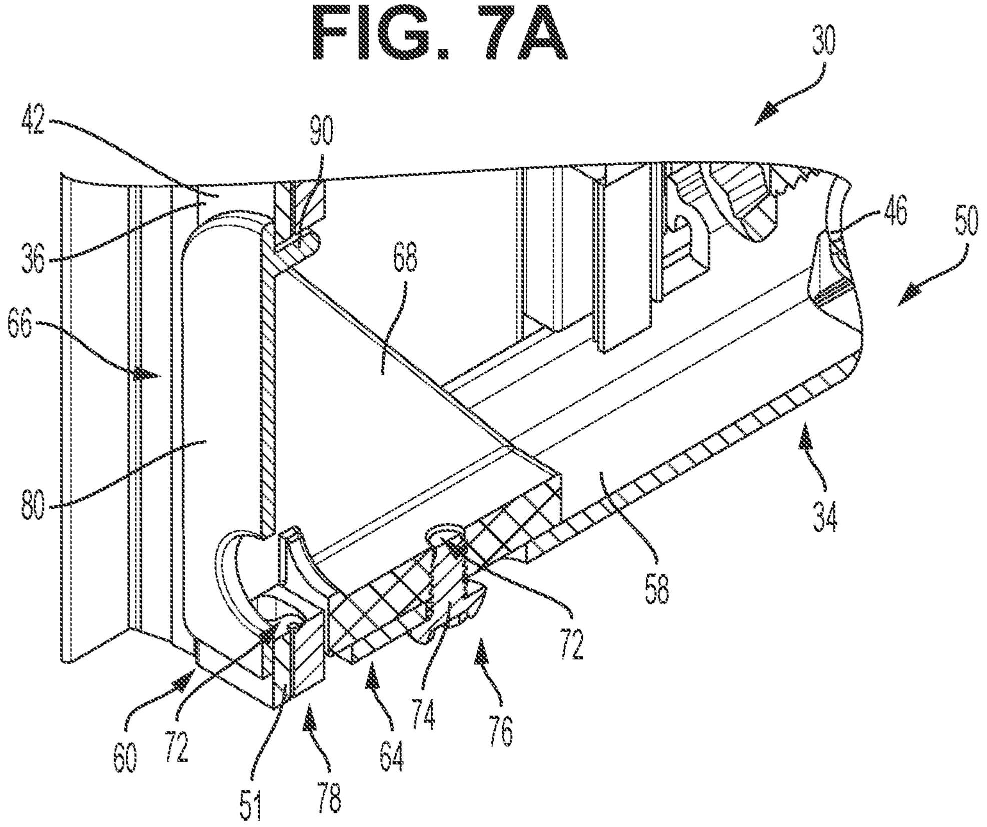
FIG. 7B is a sectional view of FIG. 7A with the plug removed, in accordance with some embodiments.

In some embodiments, the vertical housing portion 66 defines a cover flange 90 configured to abut against the first side 42 (e.g., the vertical member 36) of the panel 30. In some embodiments, the cover flange 90 abuts against the access opening 52 (e.g., as shown in FIG. 7B). In this way, the cover flange 90 may create a seal between the end cap 60 and the panel 30 such that the access opening 52 is sealed. In some embodiments, a size of the access opening 52 is substantially the same as a size of the cover flange 90.

In some embodiments, a gap 78 is defined within the housing 62 between the vertical housing portion 66 and the horizontal housing portion 64 (e.g., at an intersection between the vertical housing portion 66 and the horizontal housing portion 64). A portion 51 of the panel 30 may be operable to sit within the gap 78 when the end cap 60 is coupled to the panel 30 (e.g., as shown in FIG. 7B). The portion 76 of the panel 30 may define the lower edge 56 of the access opening 52.

FIGS. 6A-6C are an isometric view, front view, and rear view, respectively of the end cap 60 of FIG. 5 with the plug 84 removed, in accordance with some embodiments. The cover 80 may further include the side opening 82. In some embodiments, the side opening 82 may be circular in shape. The side opening 82 may allow a user access to the bottom opening 72 of the horizontal housing portions 64 when the plug 84 is removed (e.g., as shown in FIGS. 6B-6C). The side opening 82 may also allow a user to access the interior of the horizontal member 34 (e.g., as shown in FIGS. 7A-7B). The side opening 82 may be covered and sealed by the plug 84. The plug 84 may include a plug projection 88 that extends within the inner channel 70 defined by the angled walls 68. The plug 84 may include a plug lip 86 configured to abut against the cover 80 to seal the side opening 82. In some embodiments, the plug lip 86 may project outwardly from the cover 80 to allow a user to remove the plug 84 from the cover 80 by applying a force (e.g., a pulling force) on the plug lip 86.

FIG. 7A is an isometric view of the end cap 60 coupled to the panel 30, in accordance with some embodiments. FIG. 7B is a sectional view of FIG. 7A with the plug 84 removed, in accordance with some embodiments.

As shown in FIGS. 7A-7B, the end cap 60 may be removably coupled to the vertical member 36 within the access opening 52. The end cap 60 may be located proximate to the roller mount 46 positioned in the interior of the horizontal member 34 such that the side opening 72 of the end cap 60 is aligned with the roller mount 46. In some embodiments, the roller mount 46 includes a threaded fastener 47 that is rotatable (e.g., a screw) and operable to adjust the height of the set of rollers 48 where the height adjustment is relative to the frame 12. As described with respect to FIG. 4C, when the plug 84 is removed from the end cap 60, a side opening 72 is revealed. Through the side opening 72, a user can access the threaded fastener 47 of the roller mount 46 with a tool (e.g., a screwdriver) to adjust a height of the roller mount 46 (e.g., by turning the screw) without removing other components of the panel 30. This allows the user to adjust the roller mount 46 with ease and allows the user to access the roller mount 46 after the panel 30 is installed within the frame 12 or within the building structure. The roller mount 46 may be integral to or coupled to a corner block 100. The corner block 100 will be discussed subsequently.

As shown in FIG. 7B, the end cap 60 may be coupled to the horizontal member 34 at the seal 58. The fastener 74 may be operable to be fastened through the bottom opening 72 of the horizontal housing portion 64 to couple to the seal 58 at a complementary opening of the seal 58. In some embodiments, the seal 58 may include a weather seal. The bottom opening 72 may include a threaded aperture complementary to threading on the fastener 74 (e.g., a threaded bolt or screw). As discussed above, coupling the horizontal housing portion 64 of end cap 60 to the seal 58 may be achieve continuous sealing along the horizontal member 34. The continuous sealing may include continuous sealing at the corner 50. By coupling the end cap 60 to the seal 58, the continuous sealing may remain intact when the panel 30 is longitudinally translated (e.g., slid along the frame) through the fastener 74 coupling.

Further to FIG. 7B, the end cap 60 may include the cover flange 90. The cover flange 90 may be configured to abut against the vertical member 36 (e.g., the first side 42 of the panel 30). The cover flange 90 may abut the vertical member 36 at or along the upper edge of the access opening 52 and extend within the access opening 52. By abutting the vertical member 36 at the access opening 52, a seal may be formed between the end cap 60 and the vertical member 36. The upper engagement edge 92 of the cover 80 may extend along the vertical member 36 such that the upper engagement edge 92 abuts an exterior surface of the vertical member 36 above the access opening 52. The cover 80 may also project outwardly from the vertical member 36 to allow a user to apply a force (e.g., a pulling force) to the cover 80 to transition the cover 80 from a fully installed position (e.g., as shown in FIG. 9A) to a partially installed position (e.g., as shown in FIG. 9B).

Figure 8A:
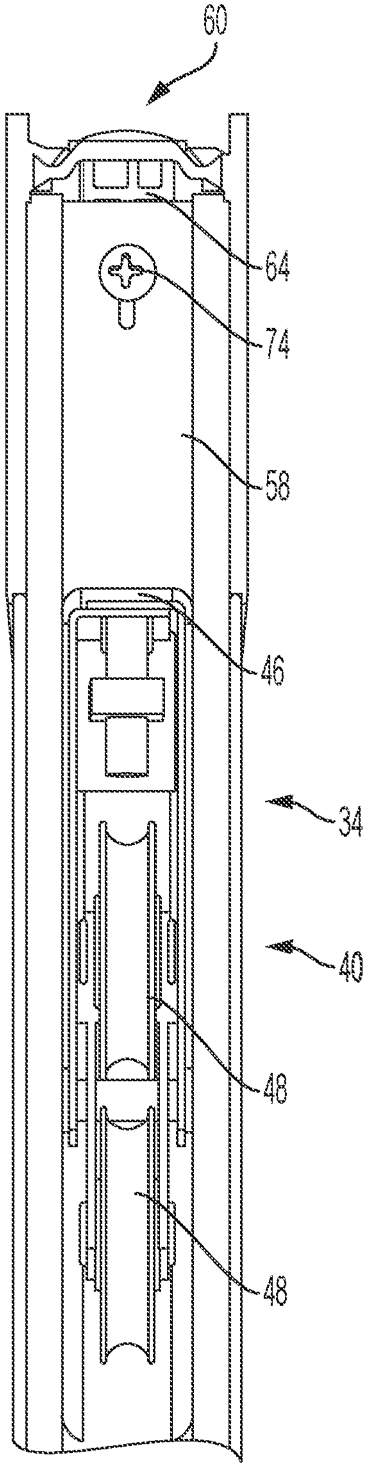
FIG. 8A is a bottom view of a horizontal member of the panel, in accordance with some embodiments.
Figure 8B:
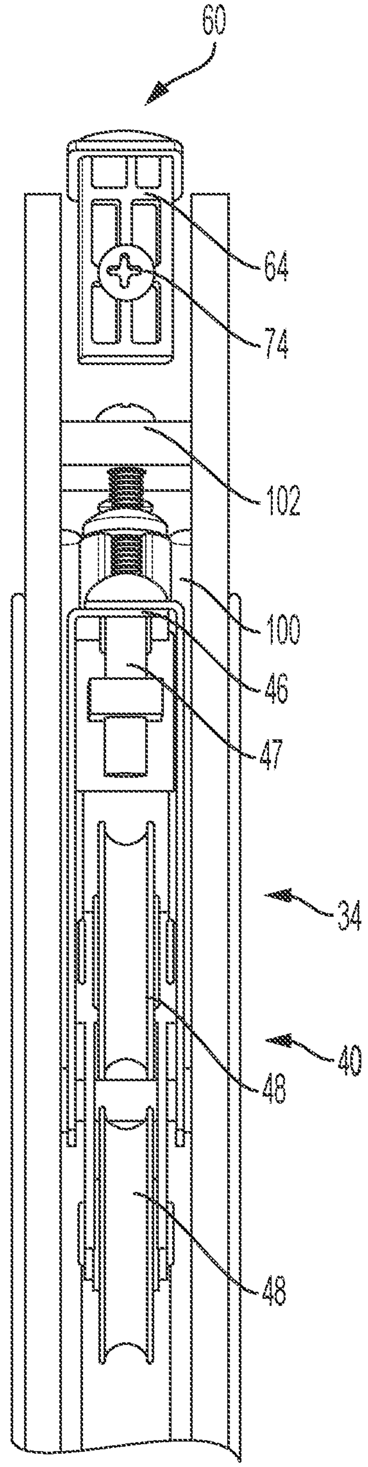
FIG. 8B is a bottom view of the horizontal member of the panel of FIG. 8A with a seal removed, in accordance with some embodiments.

FIG. 8A is a bottom view of the horizontal member 34 and seal 58 of the panel 30, in accordance with some embodiments. FIG. 8B is a bottom view of the horizontal member 34 of panel 30 with the seal 58 and vertical member 36 removed, in accordance with some embodiments.

As shown in FIG. 8A, the end cap 60 may be coupled to the horizontal member 34 at the seal 58 via the fastener 74. The coupling to the seal 58 may create a continuous seal on the horizontal member 34. As shown in FIG. 8B, further to FIGS. 7A-7B, the end cap 60 may be coupled to the panel 30 proximate to the roller mount 46. The roller mount 46 may include the set of rollers 48 or may be located proximate to and in communication with the set of rollers 48. The roller mount 46 may be operable to adjust the height of the set of rollers 48 (e.g., at the threaded fastener 47). In some embodiments, the roller mount 46 is accessible to a user via the side opening 72 of the end cap 60. The end cap 60 allows the roller mount 46 (or the threaded fastener 47) to be accessed without disassembling or un-installing the panel 30 from the frame 12 or from the building structure.

Figure 9A:
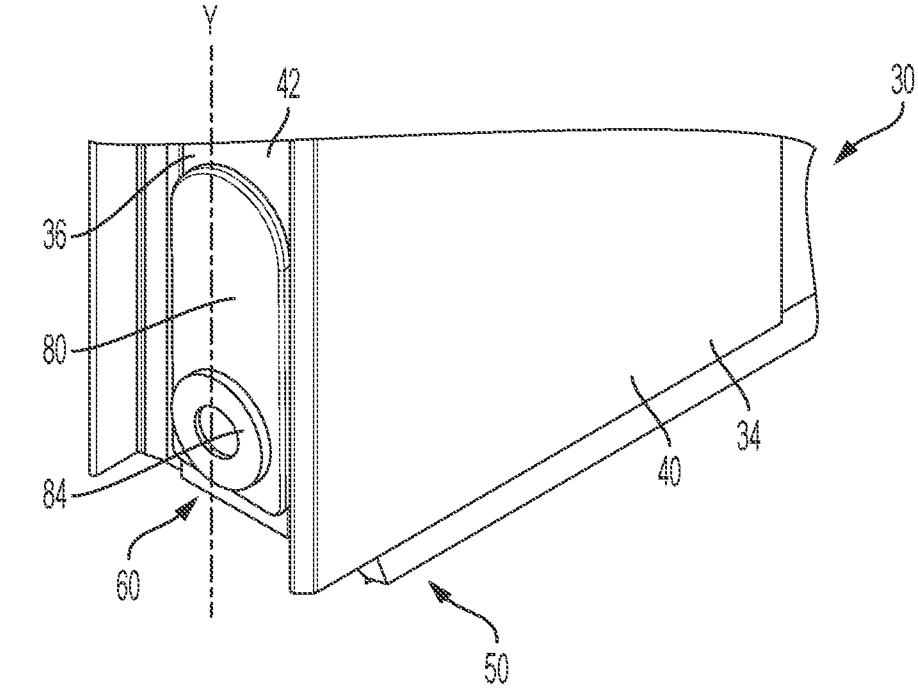
FIGS. 9A-9B are isometric views of the end cap in an installed position and in a partially installed position, respectively, in accordance with some embodiments.
Figure 9B:
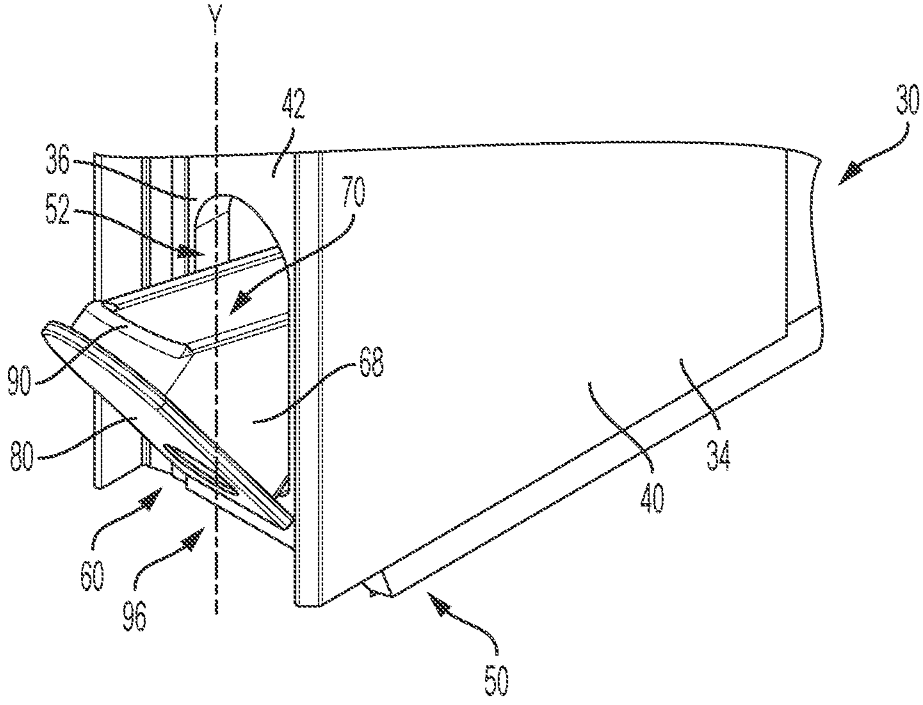

FIGS. 9A-9B are isometric views of the end cap 60 in an installed position and in a partially installed position (or partially removed position), respectively, in accordance with some embodiments. The partially installed position may be defined by the end cap 60 projecting outwardly from the access opening 52. The end cap 60 may project substantially perpendicular to the vertical member 36 relative to the vertical axis Y of the vertical member 36. In the partially installed position, portions of the access opening 52 may be uncovered or unsealed by the end cap 60. The end cap 60 is operable to be rotated from the partially installed position of FIG. 9B to the installed position of FIG. 9A within the access opening 52 by first inserting the horizontal housing portion 64 into the access opening 52 and then rotating the vertical housing portion 66 into engagement with the panel 30 to the fully installed position of FIG. 9A. To remove the end cap 60, the reverse is done where the end cap 60 is transitioned from the installed position of FIG. 9A to the partially installed position of FIG. 9B by being rotated out from the access opening 52. The angle walls 68 of the end cap 60 may facilitate the rotation of the end cap 60 at either for installation into the access opening 52 or for removal from the access opening 52.

In some embodiments, the lower edge 94 of the cover 80 is rotatably positioned within the access opening 52 such that a hinge 96 is formed. The hinge 96 may also allow the cover 80 to rotate about the hinge 96 for facilitation of installation or removal of the end cap 60 from the access opening 52.

In some embodiments, the user may transition the end cap 60 between the installed position of FIG. 9A to the partially installed position of FIG. 9B by applying a force (e.g., a pulling force) to the cover 80. The force may be applied to the upper engagement edge 92 of the cover 80. The user may then access the interior of the panel 30 (e.g., the interior of the horizontal member 34) when the end cap 60 is removed from the access opening 52. This may allow the user to access the interior of the panel 30 (e.g., to complete repairs, perform maintenance, or install the panel 30) without disassembling the panel 30 or removing large components from the panel 30 to gain access. Afterwards, the end cap 60 can be re-installed into the access opening 52 to re-seal and cover the access opening 52.

Figure 10:
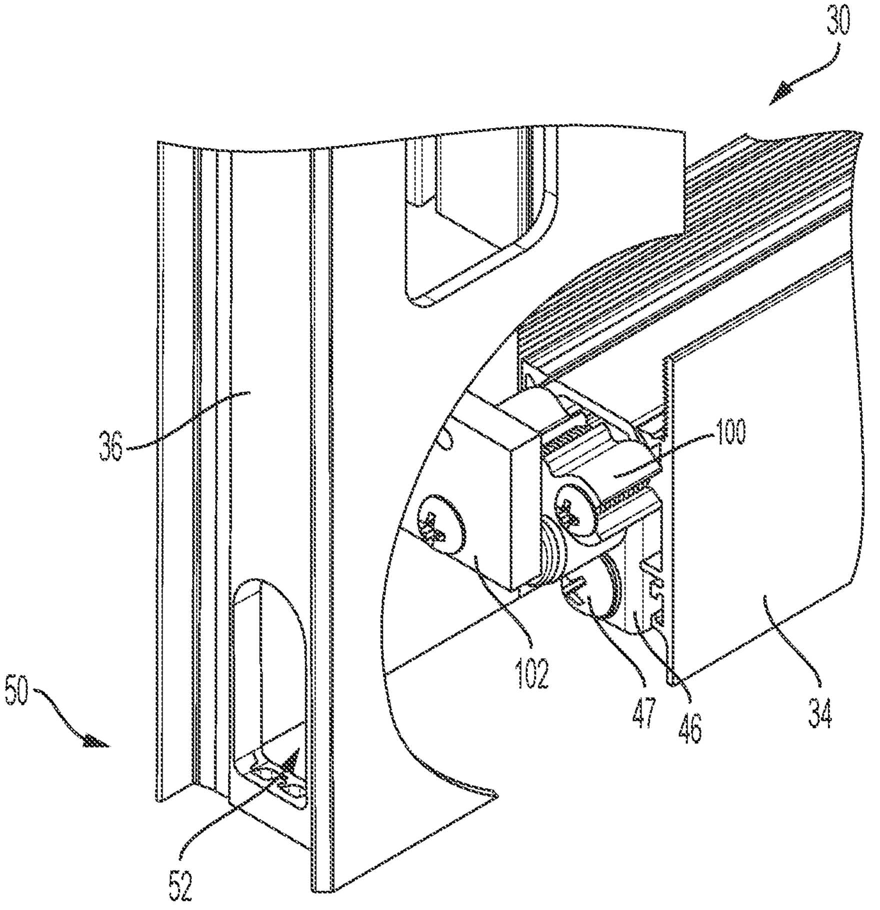
FIG. 10 is an isometric view of a corner of the panel including a corner block, in accordance with some embodiments.

Turning now to FIG. 10, the corner 50 of panel 30 may further include a corner block 100. For ease of illustration in FIG. 10, the end cap 60 and the seal 58 are removed from the assembly, with a portion of the vertical member 36 removed for visualization purposes. The corner block 100 may be positioned proximate to the access opening 52. The corner block 100 may be operable to couple the horizontal member 34 and the vertical member 36 together where they intersect at the corner 50. The corner block 100 may be integral to the roller mount 46 or removably coupled to the roller mount 46. In some embodiments, the vertical member 36 may include a vertical mount 102. The vertical mount 102 may be an internal projection secured within a body of the vertical frame member 36. The vertical mount 102 may define at least one aperture configured to receive a fastener (e.g., a third fastener 116*c* as shown and described with respect to FIGS. 12A-12B). The vertical mount 102 may include additional apertures configured to receive fasteners or the like to secure the vertical mount 102 to the vertical frame member 36. In some embodiments, the corner block 100 may be removably coupled to the vertical mount 102 (e.g., with the third fastener 116*c* as shown and described with respect to FIGS. 12A-12B.). Though the corner block 100 is described with respect to the corner 50, any corner defined by the panel 30 may include the corner block 100.

Figure 11A:
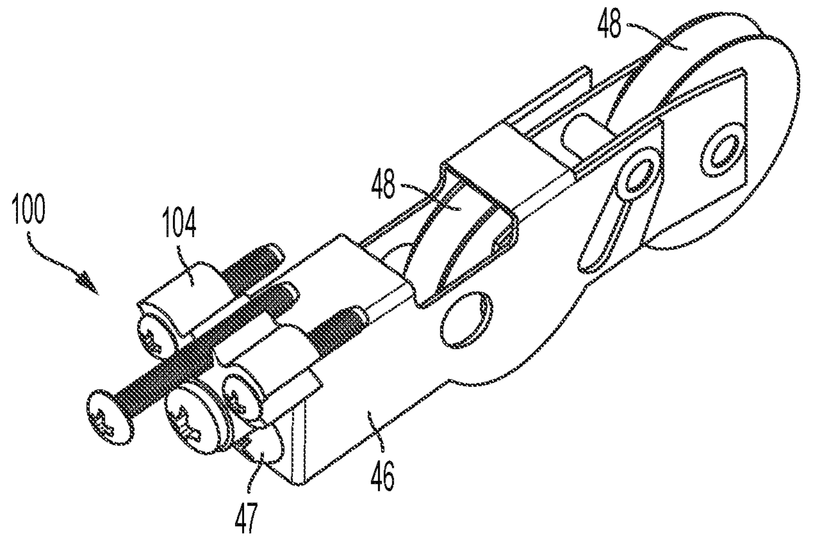
FIGS. 11A-11B are an isometric view and a front view, respectively of the corner block coupled to a roller mount of the panel, in accordance with some embodiments.
Figure 11B:
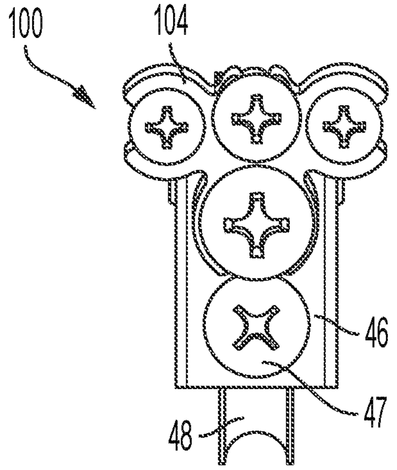
Figure 12A:
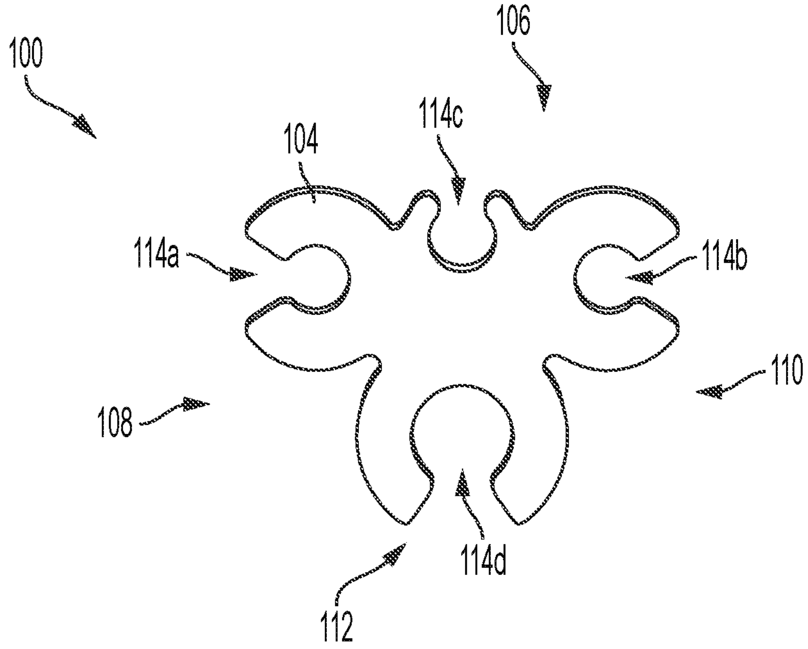
FIGS. 12A-12B are front views of the corner block, in accordance with some embodiments.

FIGS. 11A-11B are an isometric and front view, respectively, of the roller mount 46 and the corner block 100. As shown, the corner block 100 may be removably coupled to the roller mount 46. The corner block 100 may include a body 104 defining a top portion 106, a first side portion 108, a second side portion 110, and a bottom portion 112 (e.g., as shown in FIG. 12A). The corner block 100 may be substantially symmetrical about a vertical axis defined through the center of the body 104. In some embodiments, the body 104 of the corner block 100 includes, or is otherwise formed of a metallic or metal material. The metallic or metal material may include, but is not limited to, aluminum. The body 104 may define a plurality of cavities 114 (e.g., as shown in FIG. 12A) that are each operable to receive a fastener therethrough.

FIG. 12A is a front view of the corner block 100 without a plurality of fasteners 116 received in the plurality of cavities 114, in accordance with some embodiments. The plurality of cavities 114 may include a first cavity 114*a* located on the first side portion 108 of the body 104. The plurality of cavities 114 may also include a second cavity 114*b* on the second side portion 110 of the body 104. The first cavity 114*a* and the second cavity 114*b* may be located across from each other on the body 104. The first cavity 114*a* and the second cavity 114*b* may be substantially the same size and substantially rounded. The plurality of cavities 114 may further include a third cavity 114*c* on the top portion 106 of the body. The third cavity 114*c* may be located substantially in-between the first cavity 114*a* and the second cavity 114*b*. The third cavity 114*c* may also be substantially rounded. In some embodiments, the third cavity 114*c* may be smaller in size than either the first cavity 114*a* and the second cavity 114*b*, but other configurations are contemplated where the third cavity 114*c* is larger or substantially the same size as the first cavity 114*a* and the second cavity 114*b*. The plurality of cavities 114 may further include a fourth cavity 114*d* located on the bottom portion 112 of the body 104. In some embodiments, the fourth cavity 114*d* is located directly below the third cavity 114*c*, though other configurations are contemplated where the third cavity 114*c* and fourth cavity 114*d* are offset from each other. The fourth cavity 114*d* may also be substantially rounded. In some embodiments, the fourth cavity 114*d* may be larger in size than any of the first cavity 114*a*, the second cavity 114*b*, or the third cavity 114*c*, but other configurations are contemplated where the fourth cavity 114*d* is smaller than or substantially the same size as any of the first cavity 114*a*, the second cavity 114*b*, and/or the third cavity 114*c*. In some embodiments, the third cavity 114*c* and the fourth cavity 114*d* are in reversed locations where the third cavity 114*c* is on the bottom portion 112 and the fourth cavity 114*d* is on the top portion 106.

Figure 12B:
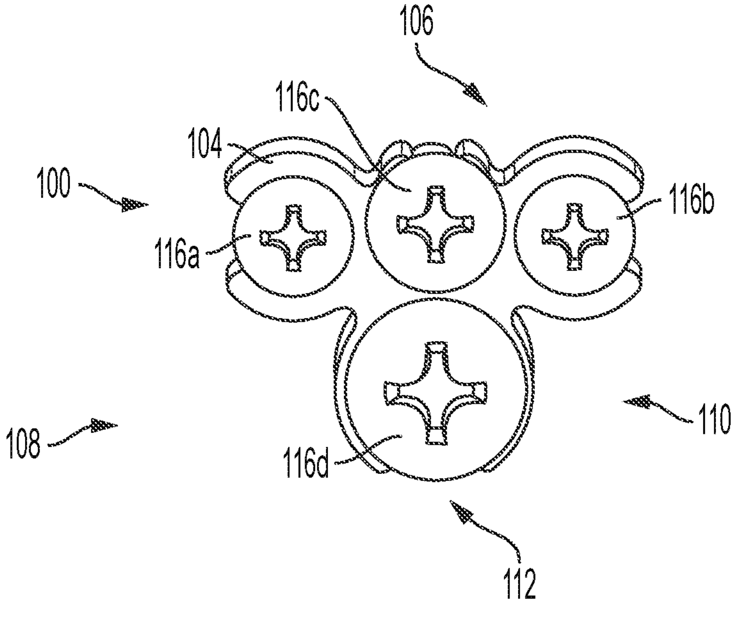

FIG. 12B is a front view of the corner block 100 with the plurality of fasteners 116 received in the plurality of cavities 114, in accordance with some embodiments. The first cavity 114*a* may receive a first fastener 116*a* therethrough. The first fastener 116*a* may removably couple the corner block 100 to the horizontal member 34 or to a fixture coupled to the horizontal member 34 (e.g., the roller mount 46). The second cavity 114*b* may receive a second fastener 116*b* therethrough such that the second fastener 116*b* is parallel to the first fastener 116*a*. The second fastener 116*b* may also removably couple the corner block 100 to the horizontal member 34 or to a fixture coupled to the horizontal member 34 (e.g., the roller mount 46). The third cavity 114*c* may receive a third fastener 116*c* therethrough. The third fastener 116*c* may removably couple the corner block 100 to the vertical member 36. As shown in FIG. 4A, the third fastener 116*c* may be accessible to a user through the access opening 52 when the end cap 60 is removed. This may allow a user to adjust the coupling of the horizontal member 34 and the vertical member 36 during or after installation of the vertical member 36. In some embodiments, the vertical member 36 may include a vertical mount 102 (e.g., as shown in FIG. 10) and the third fastener 116*c* may removably couple to the vertical mount 102. This configuration allows for two fasteners (e.g., the first fastener 116*a* and the second fastener 116*b*) to transition to a single fastener (e.g., the third fastener 116*c*) for securing purposes when coupling the horizontal member 34 to the vertical member 36. This configuration allows for a single part assembly as opposed to a multi-part component or multiple part coupling. In different terms, the corner block acts as an adapter coupling the vertical member 36, the horizontal member 34, and the roller mount 46. This may lead to a reduction of space needed within the panel 30 for coupling the horizontal member 34 and the vertical member 36 and/or the afore-mentioned reduction in components. Overall, this may lead to a reduction in assembly time and cost as well as simpler manufacturing. This may also lead to aesthetic improvement as the corner block 100 is used within an interior portion of the panel 30 as opposed an exterior facing portion of the panel 30.

Further to FIG. 12B, the fourth cavity 114*d* may be configured to receive a fourth fastener 116*d* therethrough. The fourth fastener 116*d* may removably couple the corner block 100 to the roller mount 46 such that the roller mount 46 and the corner block 100 move together when the panel 30 is longitudinally translated. The coupling between the roller mount 46 and the corner block 100 may also allow the panel 30 to be translated in height when the roller panel 46 is adjusted in height such that the panel 30 and the roller mount 46 move together. The fourth fastener 116*d* may extend substantially parallel to the third fastener 116*c*. The fourth fastener 116*d* may also extend substantially parallel to the threaded fastener 47 of the roller mount 46 (e.g., as shown in FIG. 10). As shown in FIG. 4A, the fourth fastener 116*d* may be accessible to a user through the access opening 52 when the end cap 60 is removed. This may allow a user to adjust the coupling of the corner block 100 and the roller mount 46 after assembly and/or installation of the panel 30.

In some embodiments, each cavity in the plurality of cavities 114 may receive one of the plurality of fasteners 116. However, in other embodiments, some of the cavities in the plurality of cavities 114 may remain empty. For example, when the panel 30 is a fixed panel (e.g., stationary), at least one of the cavities in the plurality of cavities 114 may remain empty because the fixed panel does not include a roller mount 46. In an alternate embodiment of FIG. 12B, the fourth cavity 114*d* may remain empty while each of the first cavity 114*a*, the second cavity 114*b*, and the third cavity 114*c* each receive their respective fasteners to couple the horizontal member 34 and the vertical member 36.

When assembling the panel 30 using the corner block 100, the corner block 100 may be coupled to the horizontal member 34 at the first cavity 114*a* using the first fastener 116*a* and at the second cavity 114*b* using the second fastener 116*b*. Then, optionally, the roller mount 46 may be coupled to the corner block 100 at the fourth cavity 114*d* using the fourth fastener 116*d*. These steps may be done in any order. Then, the corner block 100 may be coupled to the vertical member 36 at the third cavity 114*c* using the third fastener 116*c*. In some embodiments, the corner block 100 may be coupled to the horizontal member 34 prior to coupling to the vertical member 36. This may be because the vertical member 36 may block access to the first and second cavities 114*a*, 114*b* once installed. For example, as shown in FIG. 4A, the access opening 52 may allow access to one or both of the third fastener 116*c* and the fourth fastener 116*d* but may not allow access to the first fastener 116*a* and/or the second fastener 116*b* without removing additional components.

In some embodiments, the panel 30 may include both the end cap 60 and the corner block 100. In such an embodiment, the corner block 100 may be located proximate to the access opening 52. Then, a user may be able to access the corner block 100 by removing the end cap 60 from the access opening 52. This may allow a user to include or remove the plurality of fasteners 116 from the respective plurality of cavities 114 without fully removing or uninstalling the fenestration unit 10.

Various modifications and additions can be made to the exemplary embodiments discussed without departing from the scope of the present invention. For example, while the embodiments described above refer to particular features, the scope of the invention also includes embodiments having different combinations of features and embodiments that do not include all of the above-described features.

What is claimed is:

1. A fenestration unit comprising:

a panel, the panel including a horizontal member and a vertical member, the horizontal member and the vertical member intersecting at a corner, the corner including an access opening;

a seal coupled to the horizontal member and extending lengthwise along the horizontal member; and an end cap coupled within the access opening, the end cap including, a housing including a horizontal housing portion and vertical housing portion, the horizontal housing portion coupled to the seal and the vertical housing portion defining a cover operable to cover the access opening.

2. The fenestration unit of claim 1, wherein the housing includes plastic.

3. The fenestration unit of claim 1, wherein the housing includes rubber.

4. The fenestration unit of claim 1, wherein the housing includes metal.

5. The fenestration unit of claim 1, wherein the housing includes an angled wall connecting the vertical housing portion and the horizontal housing portion.

6. The fenestration unit of claim 1, wherein the horizontal housing portion has a bottom opening operable to receive a fastener to couple the end cap to the seal.

7. The fenestration unit of claim 1, wherein the cover has a side opening.

8. The fenestration unit of claim 7, wherein the side opening is circular.

9. The fenestration unit of claim 7, further including a plug removably coupled within the side opening.

10. The fenestration unit of claim 1, wherein the vertical housing portion defines a cover flange configured to abut against the first side of the panel.

11. A fenestration unit comprising:

a panel having a top, a bottom, a first side and a second side, the panel including a rail and a stile, the rail and the stile intersecting at a corner defined at the bottom and the first side of the panel, the panel defining an access opening proximate the corner; and an end cap coupled to at least one of the stiles and the rail proximate to the corner, the end cap including, a housing including a horizontal housing portion and a vertical housing portion, the vertical housing portion defining a cover positioned within the access opening, the cover being operable to be rotated into position within the access opening by fully inserting the horizontal housing portion into the access opening and then rotating the vertical housing portion into engagement with the panel.

12. The fenestration unit of claim 11, wherein the housing includes an angled wall connecting the vertical housing portion and the horizontal housing portion.

13. The fenestration unit of claim 11, wherein the vertical housing portion defines a cover flange configured to abut against the first side of the panel.

14. The fenestration unit of claim 13, wherein the cover flange creates a seal between the end cap and the panel.

15. The fenestration unit of claim 11, wherein the cover includes a curved upper engagement edge operable to engage with an edge of the access opening.

16. The fenestration unit of claim 11, further comprising a horizontal seal extending lengthwise along the rail.

17. The fenestration unit of claim 16, wherein the end cap is coupled to the horizontal seal via a fastener.

18. The fenestration unit of claim 11, wherein a lower edge of the end cap is rotatably positioned within a lower edge of the access opening to form a hinge.

19. The fenestration unit of claim 11, wherein the end cap further defines an opening through a thickness of the vertical housing portion and a plug is removably received within the opening.

20. The fenestration unit of claim 11, wherein the fenestration unit further includes a roller mount coupled to the rail, wherein the roller mount is positioned to be accessible through the access opening.

* * * * *